United States Patent [19]

Horne

[11] Patent Number: 5,176,331
[45] Date of Patent: Jan. 5, 1993

[54] ROTATION COMPENSATION DEVICE FOR A CABLE OR SIMILAR WHICH CAN BE WOUND ON TO AND UNWOUND FROM A ROTARY DRUM

[75] Inventor: Roger Horne, Divonne-les-Bains, France

[73] Assignee: Organisation Europeenne pour la Recherche Nucleaire, Switzerland

[21] Appl. No.: 657,209

[22] Filed: Feb. 20, 1991

[30] Foreign Application Priority Data

Feb. 20, 1990 [FR] France ............................ 90 02035

[51] Int. Cl.$^5$ ............................................ B65H 75/02
[52] U.S. Cl. .................................................. 242/54 R
[58] Field of Search ..................... 242/54 R, 85, 100.1, 242/107.1, 107.11, 107.12; 191/12.2 R, 12.2 A, 12.4; 439/4, 13, 15

[56] References Cited

U.S. PATENT DOCUMENTS

| | | | |
|---|---|---|---|
| 3,061,234 | 10/1962 | Morey | 242/107.1 |
| 3,144,218 | 8/1964 | Tepe | 242/107.1 |
| 4,874,138 | 10/1989 | Kettenring | 242/54 R |
| 4,923,135 | 5/1990 | Schabmuller | 242/54 R |
| 5,098,028 | 3/1992 | Ida et al. | 242/54 R |
| 5,102,061 | 4/1992 | Suzuki et al. | 242/54 R |

FOREIGN PATENT DOCUMENTS

1071784 6/1967 United Kingdom .

Primary Examiner—John M. Jillions
Attorney, Agent, or Firm—Larson and Taylor

[57] ABSTRACT

A rotation compensation device is disclosed for a cable or similar which can be wound on and off a rotary drum. Between a rotary drum (2) supporting a cable section (1) which can be wound on or off and a fixed support (4) having a fixed cable section (5), is inserted a rotation compensation device (6) coaxial with the drum and comprising an intermediate cable section (13) wound in several successive spirals side by side and coaxial with the axis of the drum, all having the same winding direction and wound alternately from the center to the periphery for one spiral and from the periphery to the center for the next spiral, the free end of the first spiral being fixed and the free end of the last spiral being fast with the drum, the spirals being made respectively fast with each other when their individual rotation capacities are exhausted.

20 Claims, 5 Drawing Sheets

ROTATION COMPENSATION DEVICE FOR A CABLE OR SIMILAR WHICH CAN BE WOUND ON TO AND UNWOUND FROM A ROTARY DRUM

The present invention relates to a rotation compensation device for a flexible connection, such as a cable or similar, particularly a signal transmission cable, which can be wound on to and unwound from a rotary drum which may effect a predetermined number of revolutions in one direction and the other about a fixed shaft, said device comprising a cable section of given length wound, in several successive spirals each surrounding the fixed shaft and disposed side by side, the winding directions for these spirals being all identical and the windings taking place alternately from the center to the periphery for one spiral and from the periphery to the center for the adjacent spiral, the free end of the first spiral being fixed with respect to the fixed shaft and the free end of the last spiral being fast with the rotary drum, and connected to the cable wound on said drum, and temporary coupling means being provided for coupling a given spiral in rotation with the spiral of immediately preceding rank (considered in the order from the spiral connected to the rotary drum) when, during rotation of the rotary drum, said given spiral has effected a predetermined angular movement.

Such a device finds a particularly interesting, although not exclusive, application in the case of signal transmission cables and particularly in the case of such cables incorporating optical fibres or formed of optical fibres.

With a cable (electric, optical, etc...) or similar (for example a hose in which a fluid flows) which can be wound on to and unwound from a rotary drum so that the effective length of the cable may be adjusted at will, the crucial problem arises of providing a reliable and efficient connection between this cable which can be wound on to and unwound from the drum and a cable of similar nature but fixed, situated upstream of the drum.

In the case where the cable provides a single connection, this connection may be formed by well known means generally disposed at the level of the rotational axis of the drum : rotary joint in the case of a hose, rotary contact in the case of an electric connector, rotary optical connector in the case of a single channel optical connection (optical fibre).

In the case where the cable provides a small number of multiple connections (for example two or three), the same technological solutions as before may be used while multiplying the number of connecting members. On the other hand, in the case where the cable ensures a large number of multiple connections, increase of the connecting members proves to be impossible for their high number would cause problems of space, cost and reliability which are difficult to overcome in most current applications.

Furthermore, the use of connecting members may be undesirable in some fields of application and it is then desirable for the fixed cable extending upstream of the drum and the cable wound on to the drum to be only two parts of the same single cable. Such a requirement arises particularly in the field of data transmission by optical cable, for the optical connectors inevitably introduce losses which may not always be acceptable.

To attempt to solve these problems, it has already been proposed (patent GB 1 071 784) to associate with the drum, between the cable wound thereon and the fixed cable extending upstream, a rotation compensation device comprising a cable section of given length wound in several successive spirals about the fixed shaft supporting the drum, as mentioned in the first paragraph above. One end of one of the end spirals (for example its internal end) is fastened to the fixed shaft and is connected to the fixed cable situated upstream, whereas one end of the other end spiral (for example its external end) is fast with the drum while moving therewith and is connected to the cable wound on the drum.

The cable section wound in spirals inside the rotation compensation device behaves then like a watch spring, the spirals expanding or contracting as the drum rotates as a function of the direction of rotation thereof.

Although this known device solves said problems—it is in particular possible for the whole of the cable (cable situated upstream: cable wound in a spiral, cable wound on the drum) to be unitary, which eliminates the need to use coupling connectors—it has however the major drawback that each spiral only allows at most a single revolution of the drum. A number of spirals equal to the number of revolutions provided for the drum must then be provided. The result is that the device becomes cumbersome and expensive and the cumulated mechanical friction becomes rapidly prohibitive. In practice, it is scarcely possible to exceed about twenty spirals, and so the rotation of the drum remains limited correspondingly to about twenty revolutions, which does not satisfy the requirements of a good number of practical applications.

The invention has then essentially as an object to provide an improved device, comprising winding in a spiral of said known cable which, being inserted between the fixed cable situated upstream of the drum and the cable wound on the drum, allows a larger number of revolutions of the drum than the prior art device, which allows the number of revolutions of the drum to be adjusted simply as a function of the particular uses envisaged, which may be used with any type of cable or similar, including optical fibre cables which are fragile and do not withstand high tensile forces; including in addition flat optical fibre cables which do not withstand considerable torsional forces; and finally which, in a particular embodiment, allows any number, including an infinite number, of revolutions of the drum whatever the direction of rotation thereof.

To these ends, the invention provides a rotation compensation device of the type defined in the preamble which is essentially characterized in that the other ends respectively of the first and last spirals and the ends of the intermediate spirals are fast with floating supports bringing together the corresponding ends of two adjacent spirals in the vicinity of the fixed shaft for the internal ends of the spiral and the external periphery for the external ends of the spirals, and in that said temporary coupling means are adapted so that coupling of said given spiral for rotation with the spiral of immediately lower rank takes place when said given spiral has effected a predetermined number, greater than or equal to 2, of revolutions.

With this arrangement, the predetermined number of revolutions likely to be effected by the drum is formed by the cumulative total of the individual predetermined numbers of revolutions allowed by all the spirals. In particular, if, as that should be the rule for simplifying the structure and reducing the cost of the device, all the end spirals are formed identically with the same number of winding turns of the cable, the predetermined number of revolutions of the drum will be N times the predetermined number of revolutions allowed by a single spiral.

Furthermore, the choice of an appropriate number N of spirals allows the predetermined number of revolutions of the drum to be adjusted as a function of the requirements of individual uses. Such a simple modular mechanical structure as that which will be described below allows the adjustment to be made easily.

Very advantageously, the floating supports are adapted so that the corresponding ends of two adjacent spirals, situated in the vicinity of the fixed shaft for the internal ends of the spirals or situated at the external periphery for the external ends of the spirals, are connected together by portions of the cable wound in a substantially helical loop. Thus, at no position does the cable have bends or curves of too small a radius and such an arrangement may be perfectly suitable for cables formed of optical fibres or incorporating optical fibres which are very fragile from this point of view and break easily. Furthermore, this arrangement is also appropriate for flat cables for which it is desirable to avoid twisting and which must be developed flat along the whole of their extent, more so when these flat cables are flat optical fibre cables formed by several (for example eight or ten) optical fibres disposed side by side parallel to each other and coated with a single protective sheath.

Whatever the type of transmission cable used, it is generally undesirable to subject it to repeated tensile forces, and this is why most transmission cables are not adapted. It is quite particularly the case for optical fibre cables. It is therefore provided, in the device of the invention, for the unwinding of a spiral not to be total, but to be stopped before total unwinding so as to avoid damaging the active elements of the cable. To this end, temporary coupling means are associated with the up-down counting means counting the number of revolutions effected, in one direction or in the other, by a given spiral within the limit of its predetermined number of revolutions.

Considering the foregoing, it will be readily understood that the device of the invention provides the possibility of using a unitary cable, i.e. the fixed cable situated upstream of the drum and connected to the end of the first spiral fast with the fixed shaft, the cable section wound in several spirals in the device and the cable wound on the rotary drum are then different parts of one and the same cable. Thus, the connecting member inserted between the fixed cable and the cable wound on the drum in prior arrangements can be eliminated, and the drawbacks inherent in the presence of this connecting member (losses in the optical connectors in particular) are overcome.

In a preferred embodiment, each spiral is enclosed in a generally disc-shaped cassette having an internal annular chamber defined by two annular lateral walls and two peripheral walls respectively inner and outer, the two lateral walls being mutually spaced apart by a distance corresponding approximately to the transverse dimension of the cable and the two peripheral walls being provided with an aperture or similar for passing and locking the cable passing through it.

To obtain a modular structure for readily adapting the number of spirals to the maximum unwinding length desired for the cable wound on the drum, it is desirable for the cassettes to be formed all identically by stacking members which may then be mass produced, so as to reduce the manufacturing costs.

Thus, it is advantageous for the two lateral walls defining a chamber to belong to two separate parts, independent of each other in rotation. In this case, each part may have two main annular faces which are parallel and which form lateral walls of two consecutive chambers. Thus, in a preferred embodiment, the above mentioned stack may be formed by means of parts which are alternately:

wheels mounted for freely rotating on the fixed shaft and whose lateral faces are hollowed to define a lateral wall and the external peripheral wall of respectively two chambers, and annular spacers inserted between two consecutive wheels and mounted on the fixed shaft for free rotation with respect thereto and with respect to the two wheels which surround it, the lateral faces of the spacers forming the lateral walls of two consecutive chambers belonging to two different wheels.

Advantageously, the wheels have enlarged hubs, placed end to end longitudinally, and each spacer surrounds the end to end hubs of two consecutive wheels. Similarly, each spacer may have a hub which is thicker than its disc-shaped portion, which hub defines the internal peripheral wall of each chamber. Thus, a structure is obtained with inter-fitting members which is particularly compact and which may readily lead to a small-sized device.

In the structure with interfitted members which is thus defined, it is possible to insert sleeves between the cooperating hubs of the spacer and of the wheels and to configure the hub of each associated spacer and sleeve mutually so as to define therebetween an annular cavity into which open the two apertures for passing the cable provided respectively in the peripheral internal walls of two chambers situated on each side of the same spacer, the cable extending, between said two apertures, inside this annular cavity in the form of a helical loop or a helical loop section. Thus, at all points of the cable, radii of curvature are defined which are sufficient for preventing damage thereto and/or allowing correct operation thereof.

Advantageously, the external peripheral surface of each wheel is formed with a helical gutter extending between the two apertures or similar passing through the external peripheral walls of the two consecutive chambers defined by this wheel. Preferably, each wheel is then surrounded by a protective ring closing the gutter and fast with the wheel.

In a simple embodiment, the means for indexing the number of revolutions of the wheel with respect to the wheel of preceding rank comprise an indexing member and a control member therefore supported respectively by the spacer and the wheel adjacent thereto. Furthermore, it is possible to envisage progressive driving of all the wheels during rotation of the drum; for this, the up-down counting means further comprise step-down means adapted so that a spacer is driven in rotation by the wheel of following rank, at a speed less than that of the latter; in one embodiment, the step-down means are arranged in the following way:

the protective rings of the wheels have teeth on the outer side and each spacer supports two toothed wheels meshing with each other and respectively with the toothed rings of the two wheels situated on each side of the spacer, so as to form a differential coupling in which the spacer rotates at a reduced speed in a predetermined ratio with respect to the wheel which drives it.

Finally, the rotation compensation device according to the invention proves particularly advantageous to the extent that it allows compensation, not only of a predetermined number of revolutions of the drum but of an indeterminate number, however great it may be, of revolutions in one direction or in the other. Such a device may find an application for example when the length of the cable which is wound on to and unwound from the drum is very great and when a device according to the above described arrangements incorporates a considerable number of spirals leading to a prohibitive size and cost.

For this, the invention provides a rotation compensation device for a cable or similar, particularly a signal transmission cable, which can be wound on to and unwound from a rotary drum which may make an indeterminate number of revolutions in one direction or in the other about a fixed shaft, characterized in that it comprises :

two primary rotation compensation devices each formed as described above and each adapted for compensating a predetermined number of revolutions of the drum, these two devices being mounted on the fixed shaft of the drum, first junction means for connecting the fixed cable situated upstream of the drum to the free ends of the first two fixed spirals belonging respectively to the two primary devices, second junction means for connecting the cable wound on the drum to the free ends of the last two spirals driven by the drum and belonging respectively to the two primary devices, two removable connecting members for connecting the two cables coming from the first junction means respectively to the two corresponding spirals, two drive means adapted for rotating the two primary devices respectively, and control means adapted, when the drum is driven in rotation with a number of revolutions exceeding the compensation capacity of one of the primary devices, for disconnecting the connecting member of this primary device at the same time as the connecting member of the other primary device is connected so as to ensure continuity of the circuit, while the other primary device compensates the rotation of the drum, starting up the drive means of the primary device reaching the end of travel so as to bring it to its maximum compensation capacity considering the direction of rotation of the drum, reversing the operations when the other primary device in its turn reaches the end of its compensation capacity, and continuing by causing alternate operation of one then of the other primary device while the one which is not operating is brought to its initial position.

The invention will be better understood from the following detailed description of certain preferred embodiments, given solely by way of examples. In this description, reference is made to the accompanying drawings in which.

Figure 1:
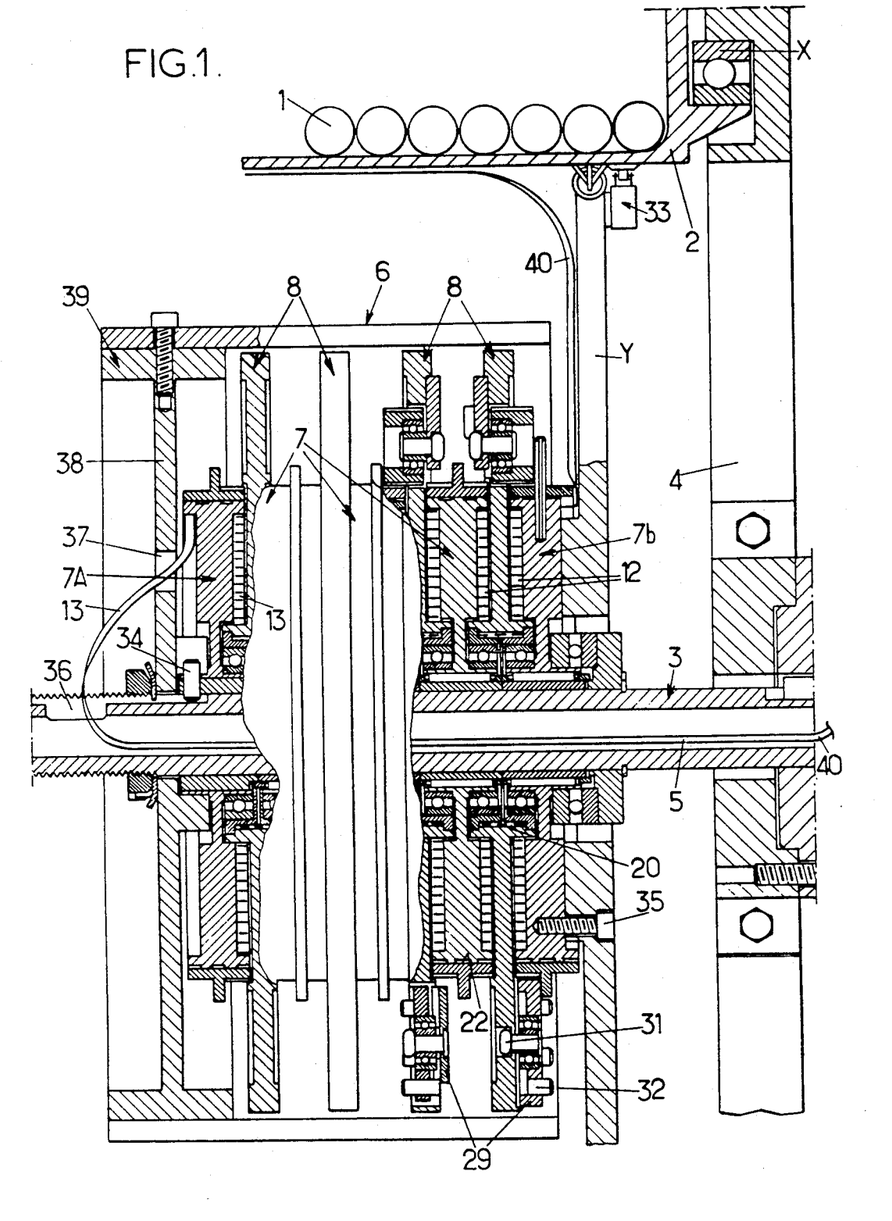
FIG. 1 is a general view, in diametrical section, of a rotation compensation device arranged in accordance with the invention.

Referring first of all to FIG. 1, a flexible connection 1 of variable effective length, is associated with a rotary drum 2 so as to be able to be wound thereon or unwound. The drum is mounted for rotation about a fixed shaft 3 fast with a support structure 4. Rotation of drum 2 may be caused either by associated drive means, or simply by a tractive force exerted on the free end of the flexible connection 1 if the mechanical strength thereof allows it.

In the device shown as a whole in FIG. 1, drum 2 may have a high weight (for example 300 kg) which leads to providing a mechanically robust assembly. For this, drum 2 is not supported by the shaft 3 about which it rotates, but is supported, via an annular bearing X equipped with ball or roller bearings, by the fixed structure 4 (only a portion of the annular bearing X can be seen in FIG. 1).

A fixed flexible connection 5, extending for example inside shaft 3 having a hollow or tubular shape, is to be connected to cable 1, while being preferably in a unitary form therewith. The rotation compensation device, designated as a whole by the reference 6, according to the invention is inserted between drum 2 and shaft 3 for providing this function.

In the following description, it will be assumed that the flexible connection is a cable and more particularly an optical fibre cable, particularly of flat type, for, considering the mechanical and optical characteristics of the fibres, it seems that the device of the invention is particularly advantageous and interesting in this case. However, it will be understood that the arrangements of the invention do not relate only to this specific type of cable and that the device of the invention may be perfectly well associated with electric cables, combined electric-optical cables, even fluid pipes or hoses for pneumatic or hydraulic connections.

As can be seen in FIG. 1, the rotation compensation device 6 is formed essentially by a stack of wheels 7 and spacers 8 coaxial with shaft 3 which supports them and are juxtaposed alternately.

Figure 2:
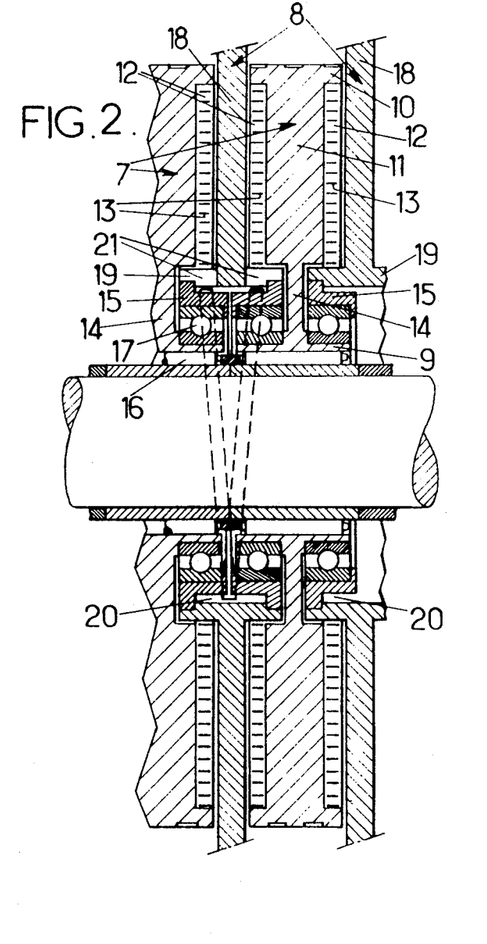
FIG. 2 is a view, on a larger scale, of a portion of FIG. 1.
Figure 3:
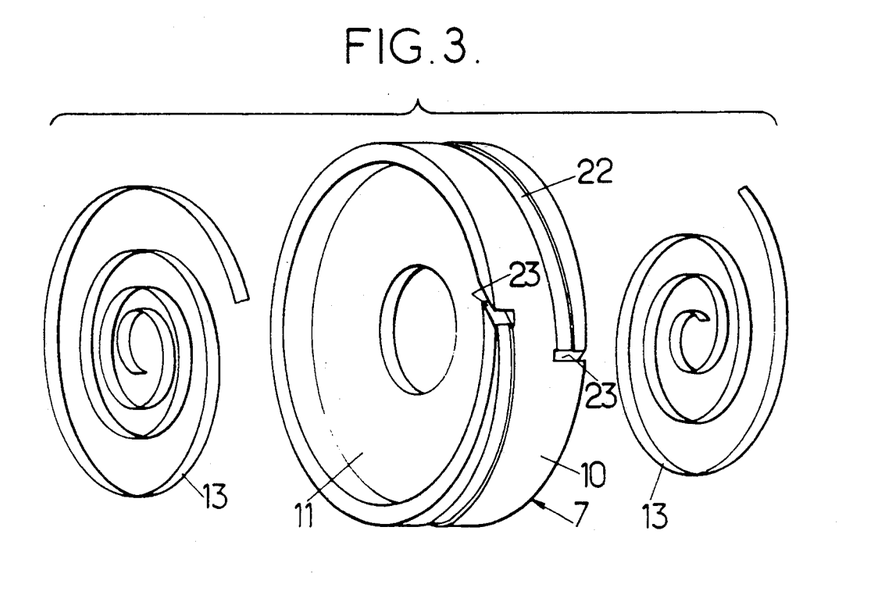
FIGS. 3 and 4 are schematic views on an even larger scale showing, in perspective, constructional details of the device of FIGS. 1 and 2.

As can be seen best in FIGS. 2 and 3, each wheel 7 comprises a wide hub 9 (not shown in FIG. 3), a rim 10 which is also wide and an intermediate web 11 of reduced thickness which define two annular cavities respectively on the two faces of the wheel. These cavities in association with the face of the juxtaposed spacer form annular chambers 12 with parallel walls (formed by the bottom wall of the cavity and the face of the spacer) in each of which is housed a portion of the spirally wound cable 13, as will be described further on.

The web 11 of each wheel has, in the vicinity of hub 9, a thinned annular portion 14 serving as axial stop and defining radial retention shoulders for sleeves 15. These sleeves surround the widened portions of hubs 9 and have a length such that they provide suitable spacing between two successive wheels so that a spacer disc 8 may be inserted therein without appreciable friction.

It will be noted that between hubs 9 and shaft 3 which they surround, bearings 16 are inserted, for example needle bearings, whereas other bearings 17, for example ball bearings, are inserted between hubs 9 of the wheels and sleeves 15.

As shown in FIGS. 1 and 2, each spacer 8 has the general form of a disc 18 with parallel faces with a widened hub 19 which surrounds sleeve 15 while bearing thereon, the length of hub 19 being substantially equal to that of the sleeve.

Furthermore, the cooperating annular surfaces of sleeve 15 and hub 19 are adapted to define therebetween an annular housing 20 which extends axially in line with the two chambers 12 situated on each side of this spacer, for example to form such a housing 20, the external surface of sleeve 15 is formed with an annular groove and hub 19 of the spacer bears on the edges laterally defining this groove (see FIG. 2).

Finally, as can be seen best in FIG. 2 and especially in FIG. 3, the wall of hub 19 of each spacer 8 is formed with two passage apertures (for example two slits) 21 situated opposite the two chambers 12 respectively and causing the latter to communicate with the annular housing 20. These two apertures 21 may be situated substantially in alignment with each other.

It will be noted here that the thickness of chambers 12—in other words the distance between the flat facing faces belonging to the bottom of each cavity of wheels 7 and to spacers 8—is defined as a function of the transverse dimension of cable 13 so as to be a little greater than this transverse dimension for holding the cable wound in spiral inside the chambers.

As can be seen in FIG. 3, the external peripheral surface of rims 10 of wheels 7 is formed with a helical groove 22 extending approximately over a revolution. As the ends of this groove two openings 23 are provided through the thickness of rim 10 and causing groove 22 to communicate respectively with the two chambers 12 defined on each side of the web 11 of this wheel.

Finally, the wheels 7 and spacers 8 are coupled together so as to form a differential device. For this, rim 10 of each wheel receives a ring 24 which is fixed thereto by a pin 25. The inner surface of this ring mates intimately with the external surface of rim 10 and thus closes the helical groove 22. In addition, the external surface of ring 24 is toothed (at 26); preferably, the teeth are divided into two toothed rings 26 separated by an annular projection 27.

Figure 6:
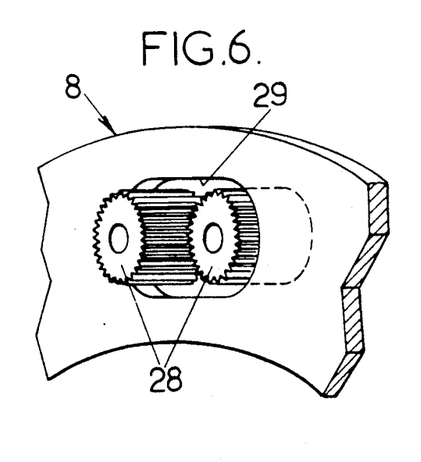
Figure 7:
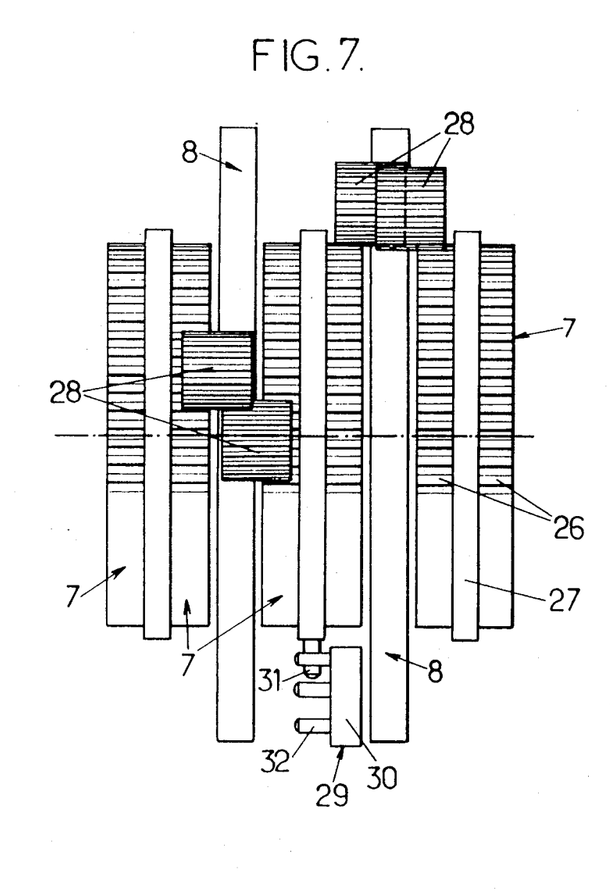
FIG. 7 is a schematic side view showing a portion of the device of FIG. 1 with, in position, those of the constructional details shown in FIGS. 5 and 6.

Correspondingly, each spacer 8 has, in the vicinity of its external periphery, a pair of pinions 28 supported by the spacer; as shown in FIG. 6, these pinions 28 are housed in an opening 29 of spacer 8 and are offset with respect to each other so that, while meshing with each other, they also mesh with the toothed ring 26 situated respectively on the two wheels 7 disposed on each side of the spacer. FIG. 7 shows schematically such a differential device formed with a stack of three wheels 7 and two spacers 8, mutually coupled by two pairs of pinions 28.

Such an arrangement defines a rotational relation between the wheels and the spacers so that, when one wheel effects a given number of revolutions (for example 24 with respect to the adjacent wheel), the spacer which separates them is forced to make a fixed number of revolutions (for example 12) in the same direction.

Referring now to FIG. 1, it will be noted here that the first wheel 7A of the device (the one situated on the left in FIG. 1) is fixed and for example fastened to shaft 3 by a key system 34. At the other end, the last wheel 7B (the one situated at the right in FIG. 1) is interlocked for rotation with drum 2. In the example shown in FIG. 1, this wheel 7B is fixed by one or more coupling bolts 35 to a disc-shaped flange Y interlocked for rotation with drum 2 in a way and for a purpose which will be explained further on.

To fix the rotation of each wheel with respect to the adjacent spacer at the maximum number of revolutions provided, temporary coupling means are provided which allow a cascade transfer of the rotational movements as the successive spirals have been completely wound or unwound, in the direction of rotation. For this, each spacer 8 has a robust index wheel 29 and an up-down counting and end of course stop mechanism 30, which are actuated by a radially projecting finger 31 (which may moreover be an extension of said pin 25) provided on the annular projection 27 of the adjacent wheel 7 (see figure 7). Each time this finger 31 passes in front of the index wheel 29, finger 31 cooperates with an index 32 thereof and rotates it by a step. After a predetermined number of passages, and so of rotational steps of the index wheel 29 (for example 12 in the above example), in the same direction of rotation, mechanism 30 is locked, which couples together the wheel-spacer pair and the following wheel-spacer pair. Each stop mechanism must then be made sufficiently robust for it to be able to transmit the drive forces; when the device is almost entirely wound on, the stop mechanism of the first wheel-spacer pair drives the whole of the other pairs and so transmits the whole of the rotational drive force, while overcoming all the cumulated friction.

For the sake of safety, the disc-shaped flange Y is locked with drum 2 by a coupling device including a force sensor 33; the drive force for overcoming the friction of the rotating device is measured by this force sensor 33 which is associated with a switch inserted in the electric supply line of the drive mechanism causing unwinding of the cable and/or which is associated with an alarm. If this drive force exceeds a predetermined level, driving of the drum is interrupted and/or the alarm is triggered.

In the structure which has just been described, the cable is disposed as follows.

Figure 4:
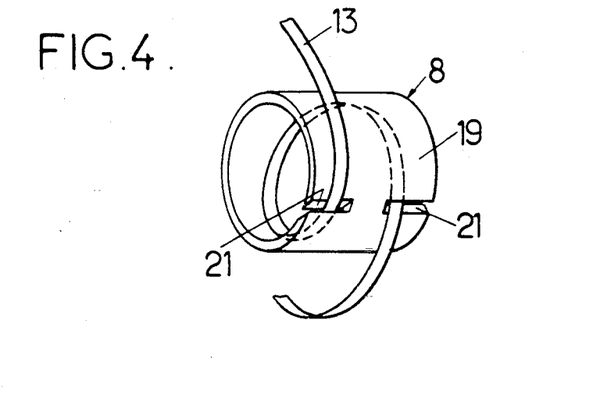
Figure 5:
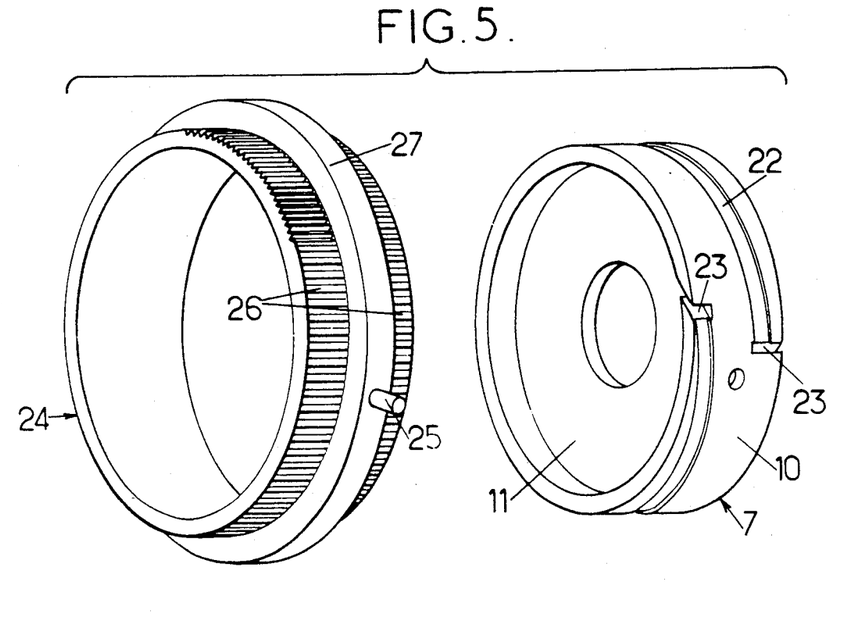
FIGS. 5 and 6 are schematic views on an even larger scale showing in perspective other constructional details of the device of FIGS. 1 and 2.

The fixed part 5 of the cable reaches the compensator device 6 through the inside of the fixed shaft 3 of hollow (tubular) form and through openings 36 and 37 formed respectively in shaft 3 and a flange 38 of a casing 39 protecting the compensator device 6, and penetrates into the annular chamber 12 facing the first wheel 7A which is fixed (see FIG. 1). Through the corresponding opening 23 in which moreover it is locked to prevent its longitudinal movement, the cable (section 13) passes through the helical groove 22, then penetrates into the adjacent annular chamber 12, in which it is wound in a spiral with a predetermined number of winding turns (see FIG. 3), from the external periphery of the chamber as far as its central wall. There, the cable 13 passes, through the corresponding opening 21 in which moreover it is locked to prevent its longitudinal movement, into the annular housing 20 inside hub 19, inside which it forms a helical loop leaving through the adjacent opening 21 in which it is also locked (see FIG. 4). It then penetrates into the annular chamber 12 of the adjacent wheel 7 situated on the other side of spacer 8 fast with said hub 19. In this chamber, the section 13 of the cable is wound in a spiral from the inside towards the outside of the chamber, which it leaves through opening 23 (see FIG. 3). And so on until the last wheel 7B which is fast with drum 2 and which the cable leaves in the form of a connecting section 40, for example fixed to the structure of the drum, for connection to cable 1 wound on the drum.

From the foregoing, it will be understood that the device of the invention allows :
on the one hand rotation of drum 2 with respect to the fixed shaft 3 by a predetermined number of revolutions, without damage to the cable,
and, on the other hand, the cable to be in unitary form, by integrating the portion 1 wound on the drum, the connecting portion 40, the section inside the compensating device 6 and the fixed section 5; this advantage is particularly appreciable in the case of an optical fibre cable, for it avoids the need to use optical connectors which weaken the quality of the transmitted signals.

Furthermore, the compensating device in accordance with the invention also allows a more elaborate apparatus to be designed allowing rotation of the drum with respect to the fixed shaft, over any number of revolutions in a given direction, including an infinite number of revolutions.

Figure 8:
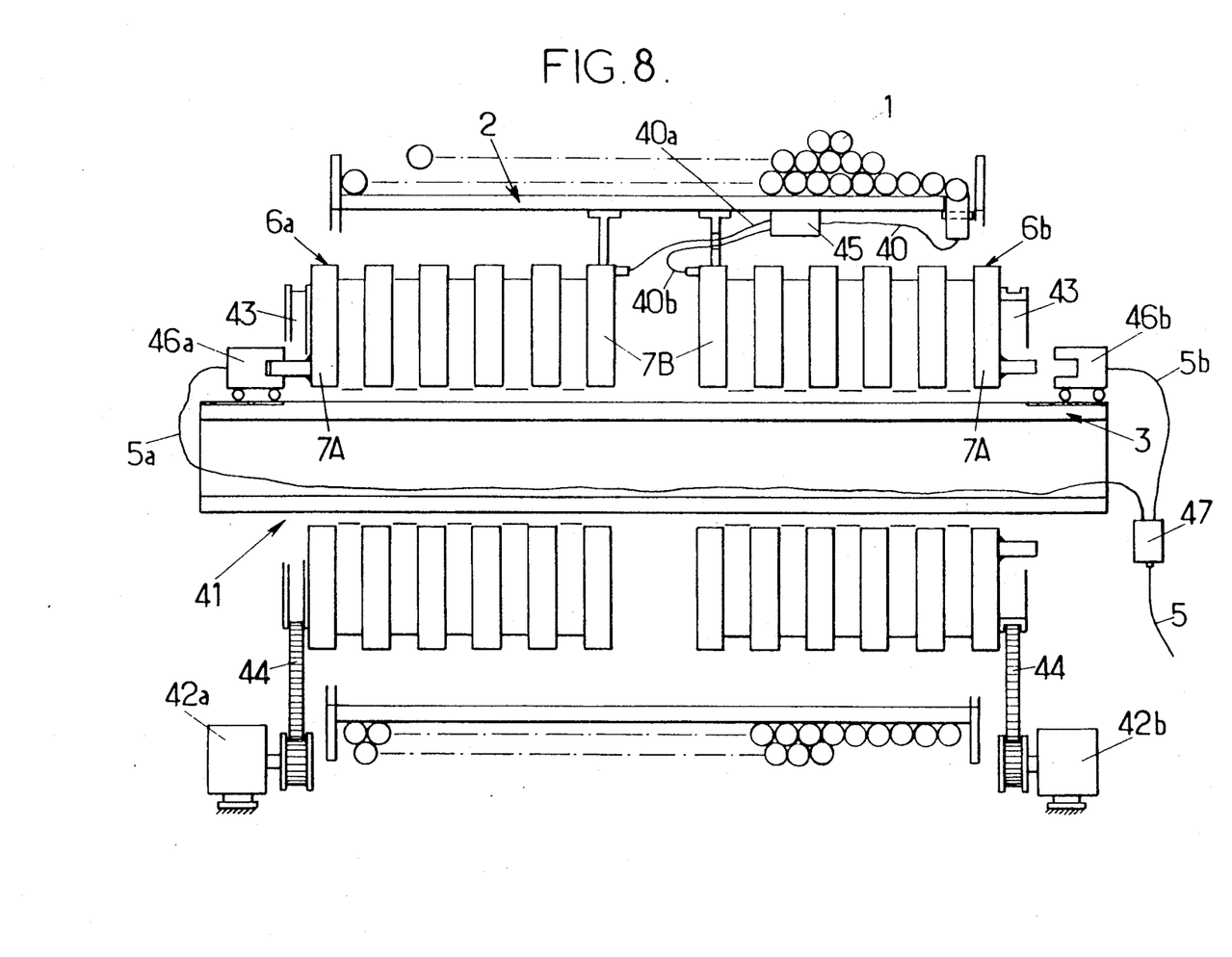
FIG. 8 is a schematic view of another embodiment in accordance with the invention.

Such an apparatus, designated as a whole by the reference 41 in FIG. 8 (in which the elements identical to those of FIGS. 1 to 7 are designated by the same references) comprises two compensating devices 6A and 6B (shown very schematically, disposed one after the other on shaft 3). As before, the respective end wheels 7B of the compensating devices are fixed mechanically to drum 1. On the other hand, the opposite end wheels 7A are no longer fixed to the fixed shaft 3, but are free to rotate thereabout and are coupled respectively to drive means 42; for example, each wheel 7A is fast with a pulley 43 driven by motor 42 via a belt or chain 44.

Cable 1 wound on the drum is connected to a connection section 40 connected to the junction box 45 of 2→1 type, whose two opposite connections are connected respectively to the two wheels 7B of devices 6a and 6b by connecting sections 40a and 40b.

With the opposite wheels 7A are associated two respective connectors 46a and 46b fastened to the fixed shaft 3, for example of the axial coupling type, which are connected, by fixed respective cables 5a and 5b to a junction box 47 of 2→1 type whose other single terminal is connected to the fixed cable 5 connected to the surrounding fixed structure. It should be noted that the connectors 46a and 46b are adapted so as to provide a double function of mechanical connection of wheels 7A to the fixed shaft 3 and connection of the cables for ensuring continuity of the transmission line.

The operating principle of apparatus 41 consists in using one of the two devices 6a, 6b whereas the other is kept in reserve and prepared for taking over from the first if the number of revolutions carried out by the drum exceeds the capacity thereof, this sequential control of the apparatus being provided by control means which have not been shown.

Thus, in the configuration shown in FIG. 8, it is the compensating device 6a which is operating (connector 46a being in the connected position and motor 42a not being energized) and able to compensate a predetermined number of revolutions of the drum in a given direction. During this period, the rotation compensation device 6b is out of circuit (connector 46b being disconnected) whereas, if that is necessary, motor 42 is energized and drives the corresponding wheel 7A so that device 6b is ready to provide a compensation function in the same direction as device 6a.

When device 6a reaches the end of its compensation capacity, motor 42b is de-energized and connector 46b is connected, which brings device 6b into service, whereas conversely connector 46a is disconnected, which results in decoupling device 6a from shaft 3. While device 6b now provides rotation compensation of drum 2, device 6a may be brought by motor 42a to its initial position, ready to take over from device 6b if necessary.

The appropriate sequential control of the apparatus may be provided by an electronic control unit (not shown) the detail of whose construction does not come within the scope of the present invention and which may be readily provided by a man skilled in the art from the preceding considerations.

As is evident, and as it follows moreover from what has gone before, the invention is in no wise limited to those of its modes of application and embodiments which have been more particularly envisaged; it embraces, on the contrary, all variants thereof.

I claim:

1. A rotation compensation device for a flexible connection, such as a cable which can be wound on to an unwound from a rotary drum, which drum may effect a predetermined number of revolutions in one direction and the other direction about a fixed shaft in a chamber, said device comprising:
a cable section of given length wound in several successive spirals, a first spiral, a last spiral and at least one intermediate spiral, the spirals, taken from one end to the other being referred to as the rank of that spiral, each spiral surrounding the fixed shaft and disposed side by side, the winding directions for these spirals being all identical and the windings extending alternately from the center to the periphery of the chamber for one spiral and from the periphery to the center of the chamber for the adjacent spiral, each spiral having a free end, the free end of the first spiral being fixed with respect to the fixed shaft and the free end of the last spiral being first with the rotary drum and connected to the cable wound on said drum, and temporary coupling means being provided for coupling a given spiral in rotation with the spiral of immediately specifying rank when, during rotation of the rotary drum, said given spiral has effected a predetermined angular movement, the other ends respectively, of said first and last spiral and the ends of the intermediate spirals being fast with floating supports bringing together the corresponding ends of two adjacent spirals in the vicinity of the fixed shaft, and said temporary coupling means being arranged so that coupling of said given spiral for rotation with the spiral of immediately lower rank takes place when said given spiral has effected a predetermined number, greater than or equal to two revolutions.

2. The device according to claim 1, said floating supports being disposed so that said corresponding ends of two adjacent spirals, situated in the vicinity of the fixed shaft are connected together by portions of the cable wound in a substantially helical lop.

3. The device according to claim 1, further comprising an up-down counting means associated with said temporary coupling means for counting the number of revolutions effected, in one direction or in the other, by a given spiral within the limit of the predetermined number of revolutions.

4. The device according to claim 3, wherein said up-down counting means comprises an indexing member and a control member therefore supported respectively by at least one spacer and at least one wheel adjacent thereto.

5. The device according to claim 4, wherein said up-down counting means further comprises a stepdown means adapted so that said spacer is driven in rotation by a wheel associated with a spiral of following rank with respect to said spacer and its associated spiral, at a speed less than that of said wheel.

6. The device according to claim 4, wherein said step-down means are arranged in the following way:
protective rings are provided for said wheels, said rings having external teeth,
each spacer supporting two toothed wheels meshing with each other and respectively with said toothed wheels meshing with each other and respectively with said toothed rings of said two wheels situated one each side of said spacer, so as to form a differential coupling in which said spacer rotates at a reduced speed in a predetermined ratio with respect to said wheel.

7. The device according to claim 1, wherein said spirals are identical and are all capable of allowing their same predetermined number of revolutions of the drum.

8. The device according to claim 1, wherein said fixed cable connected to the end of said first spiral is fast with the fixed shaft, said cable section wound in several spirals in the device and said cable wound on the rotary drum being different parts of one and the same cable, whereby connection between the fixed part of the cable and the windable part of the cable is free of any connecting member.

9. The device according to claim 1, wherein each of said spirals are individually enclosed in generally discshaped cassettes having an internal annular chamber defined by two annular lateral walls and two peripheral walls, respectively inner and outer walls, the two lateral walls being mutually spaced apart by a distance corresponding approximately to the transverse dimension of the cable and said peripheral walls being provided with an aperture for passing and locking the cable passing through said aperture.

10. The device according to claim 9, wherein said two lateral walls belong to two separate parts, independent of each other in rotation.

11. The device according to claim 10, wherein each pat of said separate parts has two main annular faces which are parallel and which form lateral walls of two consecutive chambers.

12. The device according to claim 11, wherein each wheel is surrounded by a protective ring closing said gutter and fast with said wheel.

13. The device according to claim 11, wherein said external peripheral wall of each wheel is formed with a helical gutter extending between the said two apertures passing through the external peripheral walls of said two consecutive chambers defined by said wheel.

14. The device according to claim 10, wherein said separate parts are alternately wheels mounted for freely rotating on the fixed shaft and whose lateral faces are hollowed to define a lateral wall and the external peripheral wall of two chambers respectively; and further comprising annular spacers inserted between two consecutive wheels and mounted on the fixed shaft for free rotation with respect thereto and with respect to two wheels which surround said spacers, the lateral faces of said spacers forming lateral walls of two consecutive chambers belonging to two different wheels.

15. The device according to claim 14, wherein said wheels have enlarged hubs, placed end to end longitudinally, and in that each of said spacers surrounds the end to end hubs of two consecutive wheels.

16. The device according to claim 14, wherein each of said spacers has a hub which is thicker than its respective disc-shaped cassette, said hub defining the internal peripheral wall of each chamber.

17. The device according to claim 16, further comprising sleeves which are inserted between cooperating hubs of said spacers and said wheels and wherein the associated hubs of each respective spacer and respective sleeve are mutually configured so as to define the therebetween an annular cavity into which opening two apertures are provided for passing the cable respectively in said peripheral internal walls of said two chambers situated on each side of the same spacer, the cable extending, between said two apertures, inside said annular cavity in the form of at least a section of a helical loop.

18. The device according to claim 1, wherein said cable comprises at least one optical fibre.

19. The device according to claim 18, wherein said cable is a flat cable comprising several juxtaposed optical fibre.

20. A rotation compensation device for a cable which can be wound on to and unwound from a rotary drum which may make an indeterminate number of revolutions in one direction or in the other about a fixed shaft, comprising:
two primary rotation compensation devices, wherein each primary rotation compensation device comprises
a cable section of given length wound in a winding direction and forming several successive spirals, a first spiral, a last spiral and at least one intermediate spiral, the spirals, taken from one end to the other being preferred to as the rank of that spiral, each spiral surrounding the fixed shaft and disposed side by side, said winding directions for said spirals being all identical and the windings extending alternately from the center to the periphery of the chamber for a one spiral and from the periphery to the center of the chamber for the adjacent spiral, each spiral having a free end, the free end of said first spiral being fixed with respect to the fixed shaft and the free end of said last spiral being fast with the rotary drum and connected to said cable wound on said drum, and temporary coupling means being provided for coupling a given spiral in rotation with a spiral of immediately preceding rank when, during rotation of the rotary drum, said given spiral has effected a predetermined angular movement, the other end respectively, of said first and last spirals and corresponding ends of said intermediate spirals being fast with floating supports bringing together said corresponding ends of two adjacent spirals in the vicinity of the fixed shaft, and said temporary coupling mean being arranged so that coupling of said given spiral for rotation with the spiral of immediately lower rank takes place when said given spiral has effected a predetermined number, greater than or equal to two, revolutions, each primary rotation compensation device adapted for compensating a predetermined number of revolutions of the drum, said devices being mounted on the fixed shaft of the drum;

a first junction means for connecting the fixed cable situated upstream of the drum to said free ends of the first two fixed spirals belonging respectively to said primary devices;

a second junction means for connecting said cable wound on the drum to said free ends of the last two spirals driven by the drum and belonging respectively to said primary devices;

two removable connecting members for connecting the so cables coming from said first junction means respectively to the two corresponding spirals;

two drive means adapted for rotating said primary devices respectively; and control means adapted, when the drum is driven in rotation with a number of revolutions exceeding the compensation capacity of one of the primary devices for disconnecting said connecting member of this primary device at the same time as said connecting member of the other primary device is connected so as to insure continuity of the circuit, while the other primary device compensates the rotation of the drum, starting up the drive means of the primary device reaching the end of travel so as to bring it to its maximum compensation capacity considering the direction of rotation of the drum, reversing the operations when the their primary device in its turn reaches the end of tis compensation capacity, and continuing by causing alternate operation of one then of the other primary device while the one which is into operating is brought to its initial position.

* * * * *